United States Patent
Yamazaki et al.

(10) Patent No.: US 6,870,130 B2
(45) Date of Patent: Mar. 22, 2005

(54) LASER MACHINING METHOD AND APPARATUS THEREFOR

(75) Inventors: Etsuo Yamazaki, Yamanashi (JP); Kazuhiro Suzuki, Yamanashi (JP); Hiroaki Tokito, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 289 days.

(21) Appl. No.: 10/386,711

(22) Filed: Mar. 13, 2003

(65) Prior Publication Data

US 2003/0183608 A1 Oct. 2, 2003

(30) Foreign Application Priority Data

Mar. 28, 2002 (JP) ........................................ 2002-091102
Sep. 27, 2002 (JP) ........................................ 2002-282654

(51) Int. Cl.⁷ ............................................. B23K 26/02
(52) U.S. Cl. ............................. 219/121.83; 219/121.85
(58) Field of Search ....................... 219/121.83, 121.78, 219/121.82, 121.85

(56) References Cited

U.S. PATENT DOCUMENTS

| | | | |
|---|---|---|---|
| 5,340,962 A | * 8/1994 | Schmidt et al. | 219/121.78 |
| 5,624,587 A | * 4/1997 | Otsuki et al. | 219/121.83 |
| 6,100,498 A | 8/2000 | Nakata | |
| 6,128,546 A | 10/2000 | Basista et al. | |
| 6,430,465 B2 | * 8/2002 | Cutler | 700/193 |
| 2002/0017512 A1 | 2/2002 | Heyerick et al. | |

OTHER PUBLICATIONS

Patent Abstracts of Japan of 05285680 dated Nov. 2, 1993.
Patent Abstracts of Japan of 05212573 dated Aug. 24, 1993.
Patent Abstracts of Japan of 05006211 dated Jan. 14, 1993.

* cited by examiner

*Primary Examiner*—M. Alexandra Elve
(74) *Attorney, Agent, or Firm*—Staas & Halsey LLP

(57) ABSTRACT

An apparatus and a method for laser machining with a gap or tracing control, capable of shortening time required for moving a machining head from a machining end point of one machining shape to a machining start point of next machining shape. The laser machining is performed with the gap or tracing control in which a gap amount between the machining nozzle and the workpiece is controlled to be constant. Driving of a Z-axis is started at a predetermined velocity when the machining nozzle reaches a machining end point of one machining shape. In the drive of the Z-axis, when the Z-axis is driven by a predetermined amount, driving of an X-axis and a Y-axis is started so that the machining nozzle moves to the next machining start point by rapid traverse. A direction of driving of the Z-axis is reversed at a middle point between the machining end point and the machining start point. The driving of the Z-axis may be discontinued at a retreated point. When the gap amount reaches a predetermined amount, the gap control is started. A length of the motion path from the machining end point to the machining start point is made shorter and frequency of stopping/switching operation of the gap control axis and the machining feed axes is reduced to shorten a time required for the transition to the machining start point of the next machining shape.

10 Claims, 6 Drawing Sheets

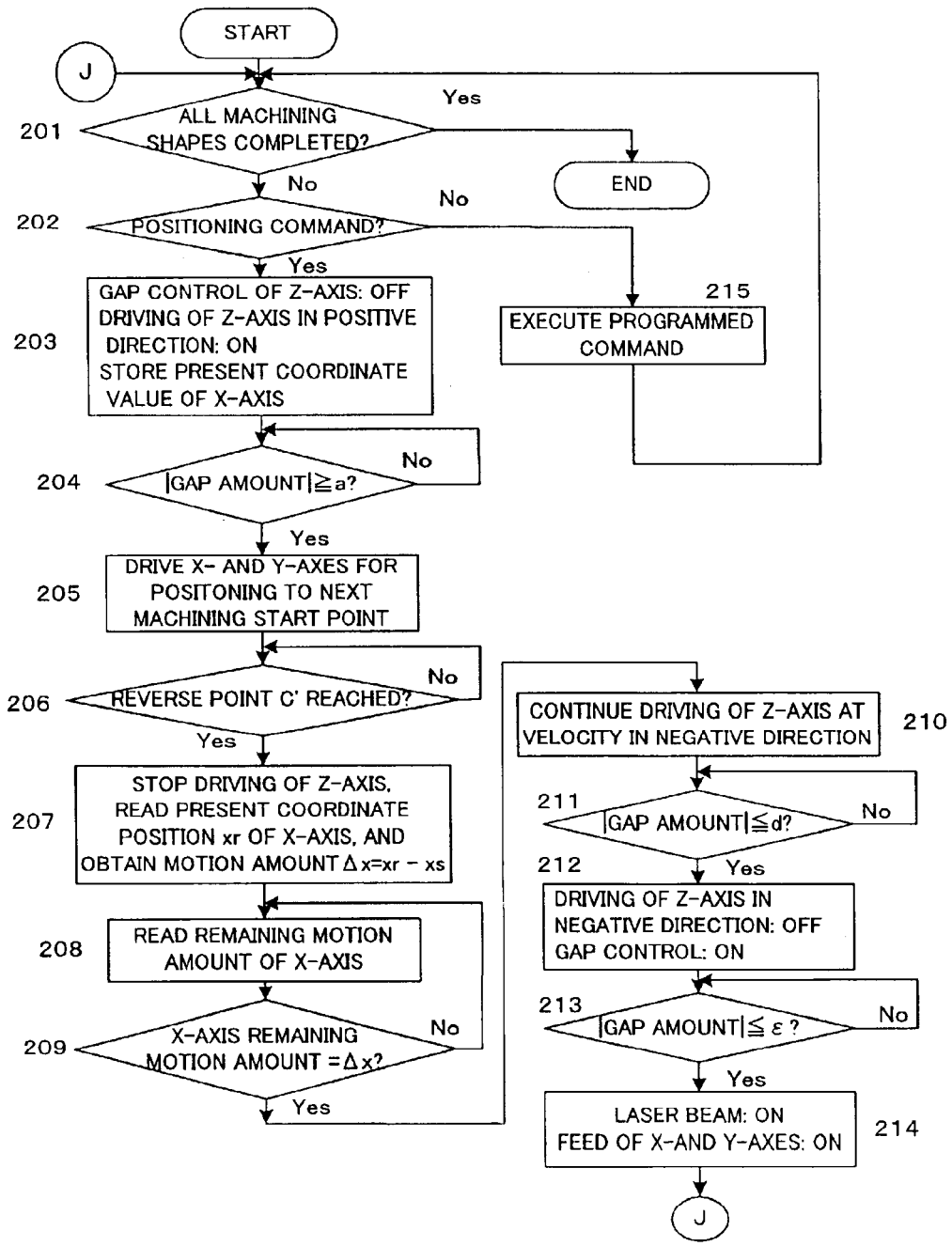

LASER MACHINING METHOD AND APPARATUS THEREFOR

BACKGROUND OF THE INVENTION

1. Field of the Invention

The present invention relates to laser machining, and in particular to laser machining method and apparatus in which a gap amount between a machining nozzle and a workpiece is maintained to be a constant value in machining.

2. Description of Related Art

There is known a laser machining method in which a machining head is moved relative to a workpiece along a predetermined machining shape while controlling a gap amount between the machining nozzle and the workpiece to be maintained to a reference value in machining. This machining method is known as laser machining with a gap control or a tracing control. In machining a plurality of separate machining shapes on a workpiece by such laser machining method, there has been adopted a process in which the gap control is discontinued at a machining end point of one machining shape and the machining head is moved away from the workpiece and then moved to a start position of a next machining shape where the gap control is continued for the next machining shape, so as to evade a possible obstacle such as a distortion of the workpiece or a dross caused by the laser machining and a cut piece suspended at the machining position.

FIG. 1 shows a conventional control method in a transition from machining of one machining shape to machining of a next machining shape.

For starting a laser machining (cutting) operation for a next machining shape S2 after completing a laser machining operation of one machining shape S1, when a machining nozzle reaches a machining end point A, the machining nozzle is moved away from the workpiece in a Z-axis positive direction by driving a Z-axis by rapid traverse by a predetermined amount to be stop at a point B, and then the machining nozzle is moved to a machining start point D of a next machining shape S2 by rapid traverse by driving X- and Y-axes. After the machining nozzle reaches the point D, the machining nozzle is moved in the Z-axis negative direction at an approach feed velocity to a point E where a gap amount is a predetermined value to start the machining of the next machining shape S2 with the gap control.

In the above method of moving the machining head for evading a possible obstacle in a motion path from a machining end point of one machining shape to a machining start point of the next machining shape, a length of the motion path of the machining head is elongated since the machining head is moved along a rectangular path, and it takes a long time for the machining head from the machining end point to the machining start point even if the machining head is moved by rapid traverse since the driving of axis is switched from the Z-axis to the X- and Y-axes and then changed to the Z-axis and the motion of the machining head is stopped each time of changing the driving of the axis, to affect machining time to cause lowering of machining efficiency.

SUMMARY OF THE INVENTION

An object of the present invention is to shorten a time required for moving a machining head from a machining end point of one machining shape to a machining start point of a next machining shape while effectively evading a possible obstacle, to improve machining efficiency.

A laser machining apparatus of the present invention comprises: a sensor for detecting a gap amount between the machining nozzle and the workpiece; first driving means for driving a gap control axis to be controlled such that the gap amount detected by said sensor is maintained to a predetermined value in machining; second driving means for driving machining feed axes to move the machining nozzle relative to the workpiece along a predetermined machining shape in machining; and a controller for controlling said first and second driving means, to start driving of the gap control axis so that the machining nozzle moves away from the workpiece at a machining end point of one machining shape and to start driving of said machining feed axes so that the machining nozzle moves to a machining start point of a next machining shape in driving the gap control axis when the gap control axis is driven by a predetermined amount or for a predetermined time. With the above arrangement, a time period required for moving a machining head from the machining end point of one machining shape to a machining start point of the next machining shape is shortened effectively evading a possible obstacle, to improve machining efficiency.

The determination whether or not the gap control axis is driven by the predetermined amount may be carried out based on the gap amount detected by the sensor, or a motion amount of the gap control axis from the start of driving thereof. Alternatively, the controller may starts the driving of the machining feed axes when a predetermined time elapses from the start of driving of the gap control axis.

The controller controls the driving of the gap control axis so that the machining nozzle moves close to the workpiece by reversing a direction of the driving of the gap control axis before coordinate position of the machining feed axes reach a coordinate position of the machining start point of the next machining shape, e.g. when the coordinate position of the machining feed axes reach a vicinity of a middle point between the machining end point of one machining shape and the machining start point of the next machining shape.

In order to enlarge a region of evading a possible obstacle, the controller discontinues the driving of the gap control axis when the coordinate position of the gap control axis reaches a retreated position, and resumes driving of the gap control axis in a reverse direction when a motion amount of the machining feed axes during the driving of the gap control axis becomes approximately equal to a remaining motion amount to the machining start point of the next machining shape.

The controller starts control of the gap control axis such that the gap amount is maintained to the predetermined value when the gap amount becomes equal to or less than a predetermined allowable value after the coordinate position of the machining feed axes reaches the coordinate position of the machining start point.

According to one aspect of a laser machining method of the present invention, driving of the gap control axis is started such that the machining nozzle moves away from the workpiece at a machining end point of one machining shape, driving of the machining feed axes is started so that the machining nozzle moves to a machining start point of a next machining shape in driving the gap control axis when the gap control axis is driven by a predetermined amount or for a predetermined time, and a direction of the driving of the gap control axis is reversed in a vicinity of a middle point between the machining end point of one machining shape and the machining start point of the next machining shape, to position the machining nozzle at the machining start point.

According to another aspect of a laser machining method of the present invention, driving of the gap control axis is started such that the machining nozzle moves away from the workpiece at a machining end point of one machining shape, driving of the machining feed axes is started so that the machining nozzle moves to a machining start point of a next machining shape in driving the gap control axis when the gap control axis is driven by a predetermined amount or for a predetermined time, the driving of the gap control axis is discontinued when coordinate position of the gap control axis reaches a retreated position, and driving of the gap control axis is continued in a reverse direction such that the machining nozzle moves close to the workpiece when a motion amount of the machining feed axes during the driving of the gap control axis becomes approximately equal to a remaining motion amount to the machining start point of the next machining shape, to position the machining nozzle at the machining start point.

According to still another aspect of a laser machining method of the present invention, driving of the gap control axis is started such that the machining nozzle moves away from the workpiece at a machining end point of one machining shape, and starting driving of the machining feed axes so that the machining nozzle moves to a machining start point of a next machining shape simultaneously with the start of driving the gap control axis, and a direction of the driving of the gap control axis is reversed in the vicinity of a middle position between the machining end point of one machining shape and the machining start point of the next machining shape, to position the machining nozzle at the machining start point.

BRIEF DESCRIPTION OF THE DRAWINGS

FIG. 7 is a flowchart of processing for moving the machining head along the motion path as shown in FIG. 2a; and FIG. 8 is a flowchart of processing for moving the machining head along the motion path as shown in FIG. 2b.

DETAILED DESCRIPTION OF THE PREFERRED EMBODIMENTS

A method of moving a machining head of a laser machining apparatus in transition from of one machining shape to a next machining shape according to the present invention will be described referring to FIGS. 2a and 2b. Each of FIGS. 2a and 2b shows a motion path of a tip point of a machining nozzle of the machining head from a machining end point A of one machining shape S1 to a machining start point E of a next machining shape S2.

Figure 2A:
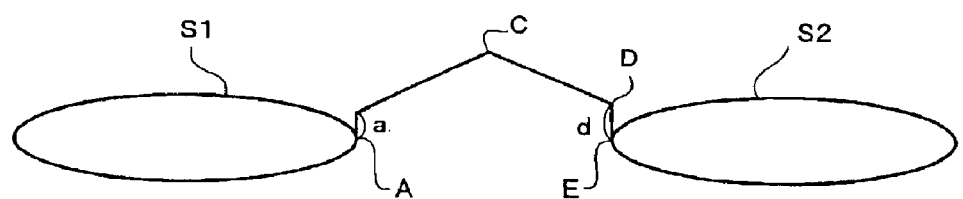
FIGS. 2a and 2b are schematic diagrams showing motion paths of a machining head with respect to a workpiece in transition of machining from one machining shape to a next machining shape according to the present invention.

First, referring to FIG. 2a, when the machining nozzle reaches a machining end point A and laser machining (cutting) of the machining shape S1 is completed, a gap control of a Z-axis is discontinued and the Z-axis is driven in a positive direction at a predetermined velocity so that the machining nozzle is moved away from the workpiece. When a gap amount between the machining nozzle and the workpiece increases by a predetermined value "a" or larger, a rapid traverse command is issued to start driving of machining feed axes of a X-axis and a Y-axis to move the machining nozzle to a starting point E of the next machining shape S2 by rapid traverse while maintaining the driving of the Z-axis at the predetermined velocity. When the coordinate values of the X- and Y-axes reach coordinate values of a reverse point C, which are set to a middle position between the machining end point A and the machining start point E in a X-Y plane, a command for reversing the driving direction of the Z-axis is issued to move the machining nozzle to approach the workpiece. In this approach motion, the gap amount is monitored and when displacement of the gap amount becomes equal to a predetermined value "d" at a point D, the driving of the Z-axis in the negative direction is switched to the gap control of the Z-axis is continued, and when displacement of the gap amount becomes equal to an allowable distance E which means completion of the approach motion, the laser machining for the next machining shape S2 is started by irradiating a laser beam and driving the X- and Y-axes such that the machining nozzle moves along the next machining shape S2 with the gap control of the Z-axis such that the gap amount is maintained to be the predetermined value. Thus, the machining nozzle is moved efficiently evading a region where an obstacle possibly exists in the motion path from the machining end point of one machining shape to the machining start point of the next machining shape.

Figure 2B:
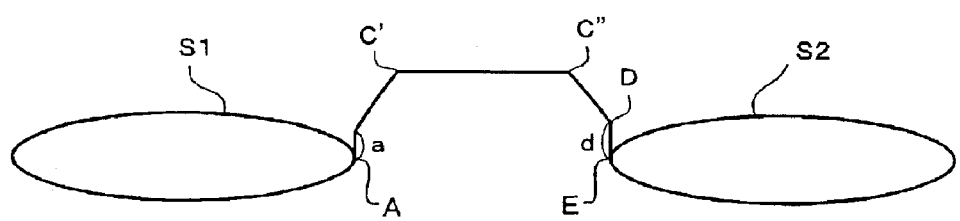

Further, in order to enlarge the region of evading a possible obstacle, a motion path of the machining nozzle as shown in FIG. 2b is adoptable. That is, when the gap amount increases by the predetermined value "a" or larger in driving the Z-axis to move the machining nozzle away from the workpiece, the driving of the X- and Y- axes is started to reach the start position E of the next machining shape S2 by rapid traverse while maintaining the driving of the Z-axis at the predetermined velocity. When the coordinate value of the Z-axis reaches a coordinate value of a predetermined retreated position C', the driving of the Z-axis is discontinued and when a remaining motion amount of the X- and Y-axes is equal to the motion amount in a period from the start to the end of the driving of the Z-axis, the driving direction of the Z-axis is reversed.

The motion of the machining nozzle in the vicinity of the machining end point A of one machining shape S1 and the machining start point E of the next machining shape S2 will be described in detail referring to FIGS. 3 and 4, respectively. In these figures, a coordinate system is shifted by a reference gap amount to which the gap amount between the machining nozzle and the workpiece is maintained in the laser machining, so that the reference gap amount is assumed to be "0". Axes of abscissa in FIGS. 3 and 4 represent the gap amount, and an axis of ordinate in FIG. 3 represents a driving velocity of the X- and Y-axes and an axis of ordinate in FIG. 4 represents a driving velocity of the Z-axis.

Figure 3:
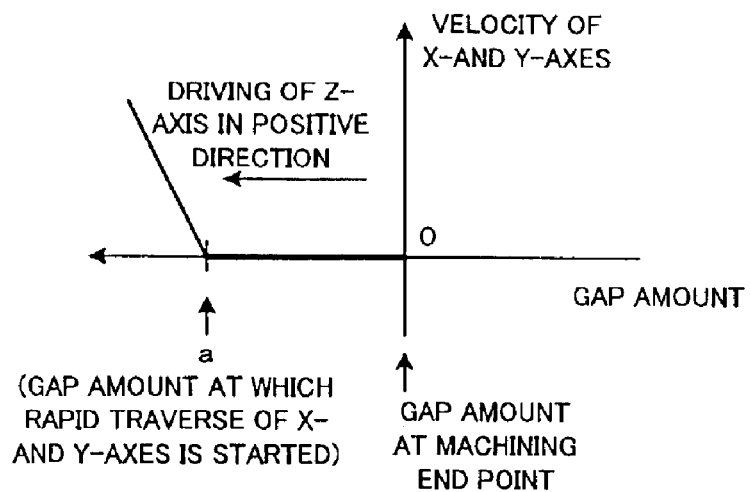
FIG. 3 is a schematic diagram showing a gap amount at a machining end point of one machining shape, and a start position of driving of X- and Y-axes.
Figure 4:
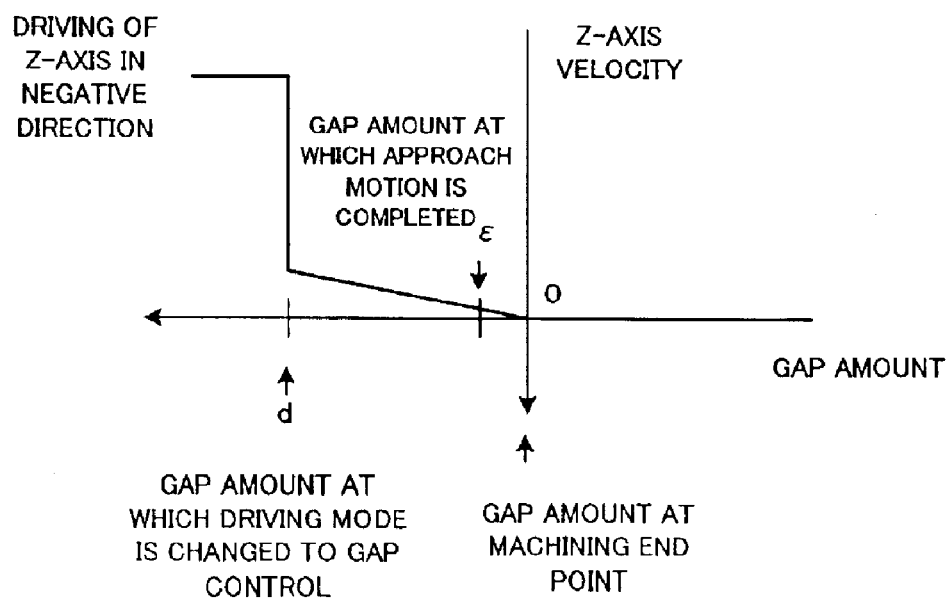
FIG. 4 is a schematic diagram showing motion of the machining head in the vicinity of the machining start point.

As shown in FIG. 3, when the machining nozzle reaches the machining end point A to complete the laser machining of the machining shape S1, the gap amount is maintained to be the reference value "0". The gap amount increases as the machining nozzle moves away from the workpiece by the driving of the Z-axis and when the gap amount reaches the predetermined value "a", the driving of the X- and Y-axes by the rapid traverse is started.

The driving direction of the Z-axis is reversed at the reverse point C and the Z-axis is driven in the negative direction to move the machining nozzle to approach the workpiece. The gap amount is monitored in the approach motion and when the gap amount reaches the predetermined value "d" which is referred to an approach gap amount, the driving velocity of the Z-axis is lowered to be switched to the gap control to reach the allowable distance ϵ and also the position of the machining nozzle in the X-Y plane reaches the position of the machining start point E to commence the laser machining of the next machining shape S2.

The position of the reverse point C is set to a vicinity of a middle position between the machining end point A and the machining start point E in the X-Y coordinate plane. FIGS. 5a–5d show motions of the machining nozzle relative to the workpiece in accordance with different position of the reverse point C.

Figure 5A:
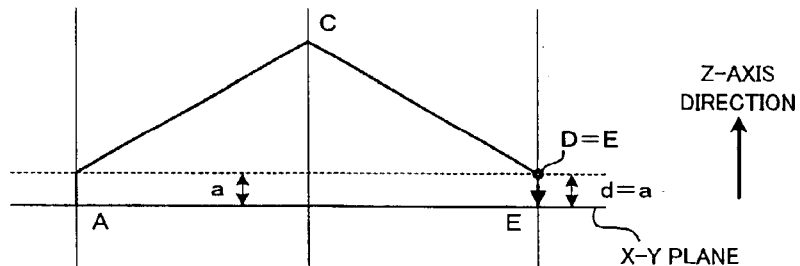
FIGS. 5a–5d are diagrams showing motions of the machining head in accordance with different reverse points at which a driving direction of a Z-axis is reversed.
Figure 5B:
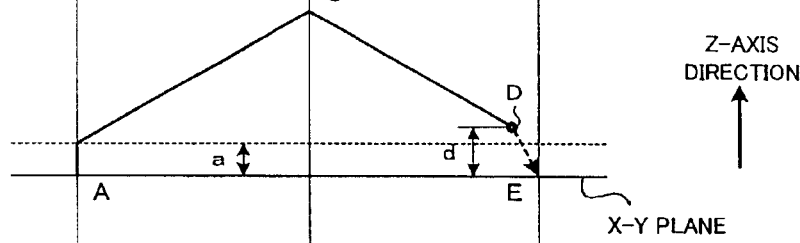

In FIG. 5a, the reverse point C is set to a middle position between the machining end point A and the machining start point E. While the position of the machining nozzle in the X-Y plane (coordinate position of the X- and Y-axes) moves from the machining end point A to the machining start point E, the gap amount in the Z-axis increases from the predetermined value "a" and decreases from the middle point C at which the driving direction of the Z-axis is reversed, to form a symmetrical motion pattern with respect to the middle point C. Therefore, when the coordinate position of the X-Y axes reaches the machining start point E, the gap amount becomes equal to the predetermined value "a". By setting the approach gap amount "d" equal to the predetermined value "a", the gap amount becomes equal to the approach gap amount "d" simultaneously with arrival of the coordinate position of the X- and Y-axes at the point E, and the control of the Z-axis is switched to the gap control. Thus, the changeover point D at which the drive of the Z-axis is changed to the gap control coincides with the machining start point E.

On the other hand, in the case where the approach gap amount "d" is set greater than the predetermined amount "a", the gap amount reaches the approach gap amount "d" before the coordinate position of the X- and Y-axes reaches the machining start point E, and therefore the changeover point D is shifted to a position before the machining start point E, so that the gap control of the Z-axis is started while the X- and Y-axes are driven by rapid traverse. If the approach gap amount "d" is set smaller than the predetermined value "a", the gap amount reaches the approach gap amount "d" after the coordinate position of the X- and Y-axes reached the machining start point E, and then the gap control of the Z-axis is started.

Figure 5C:
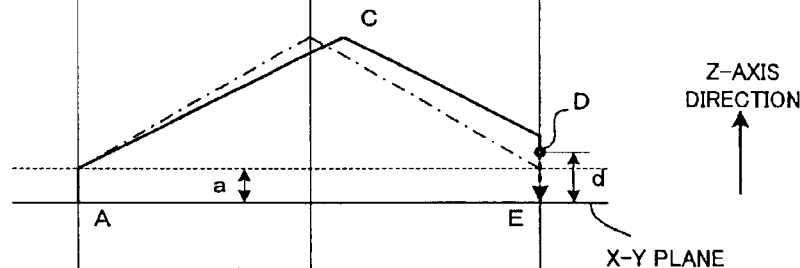
Figure 5D:
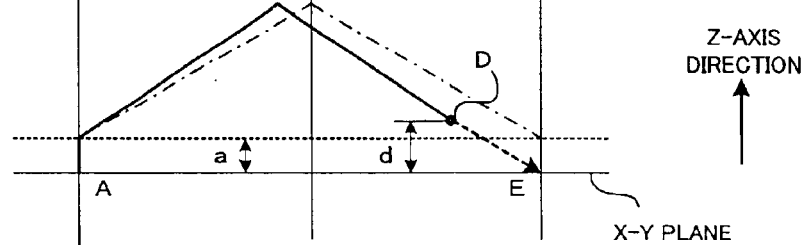

Further, if the reverse point C is set to a position closer to the machining start point E than the middle position, as shown in FIG. 5c, when the coordinate position of the X- and Y-axes reach the machining start point E, the gap amount does not reach the approach gap amount "d", and the only the driving of the Z-axis in the negative direction continues and when the gap amount reaches the approach gap amount "d", the control of the Z-axis is changed to the gap control.

In the contrary, if the reverse point C is set closer to the machining end point A than the middle position, the gap amount reaches the approach gap amount "d" before the coordinate position of the X- and Y-axes reaches the machining start point E, so that the gap control of Z-axis is started while the rapid traverse of the X- and Y-axes continues.

In general, it is desirable that the coordinate position of the X- and Y-axes has reach the X-Y coordinate position of the machining start point E, and therefore the reverse point C should be set as shown in FIG. 5a or FIG. 5c. Further, although the driving velocity of the Z-axis is set constant in the foregoing description, the driving velocity of the Z-axis may be changed in the positive direction and in the negative direction, so that the gap amount becomes equal to the approach gap amount "d" at the time when the coordinate position of the X- and Y-axes reach the machining start point E by setting the driving velocity of the Z-axis in the reverse motion to be greater than the driving velocity in the forward motion in the example as shown in FIG. 5c.

Figure 1:
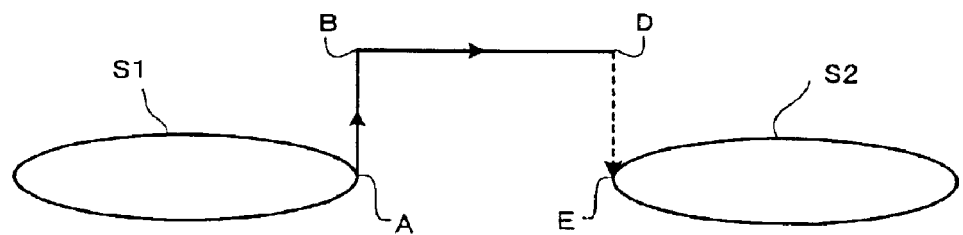
FIG. 1 is a schematic diagram showing motion of a machining head with respect to a workpiece in transition of machining from one machining shape to a next machining shape according to conventional art.

From comparison between the conventional method as shown in FIG. 1 and the method of the present invention as shown in FIGS. 2a and 2b, it is clear that the transition time required for moving the machining nozzle from the machining end point A of one machining shape S1 to the machining start point E of the next machining shape S2 is shorten according to the present invention so that the whole machining time is shortened to improve machining efficiency, since the transition time is the sum of a period for the motion of Z-axis by the amount "a", a period for the motion of the X- and Y-axes from A to E (=B to D) and a period for the motion of the Z-axis for the amount "d" according to the present invention, whilst the transition time is the sum of a period for the motion of Z-axis from A to B, a period for the motion of the X- and Y-axes from A to E (=B to D) and a period for the motion of the Z-axis from D to E in the conventional method, in which the period for the motion of Z-axis by the amount "a" is shorter than the period from A to B and the period for the amount "d" is shorter than the period from D to E.

Figure 6:
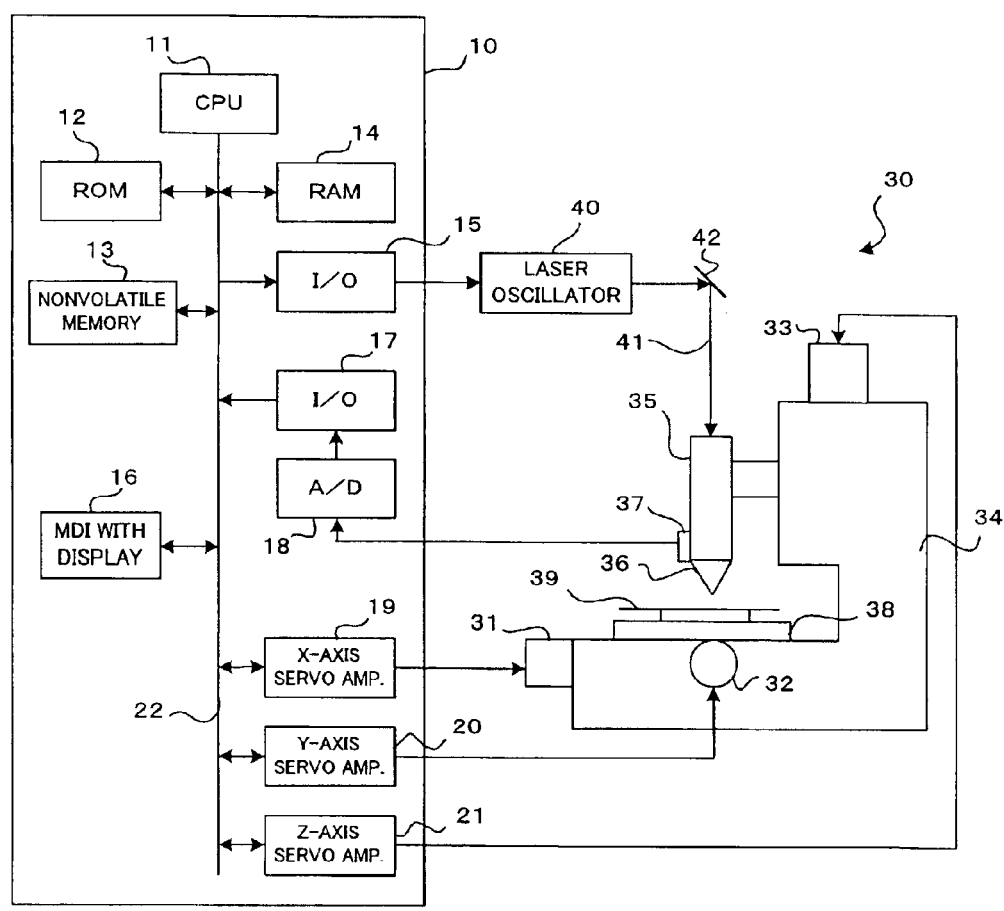
FIG. 6 is a schematic block diagram of a laser machining apparatus according to the present invention.

FIG. 6 schematically shows a laser machining apparatus 30 for carrying out the method of moving the machining head in transition from of one machining shape to a next machining shape according to the embodiment of the present invention.

In FIG. 6, a controller 10 for controlling the laser machining apparatus 30 comprises a computerized numerical controller (CNC). The controller 10 comprises a processor (CPU) 11 which is connected with a ROM 12, a RAM 14, a nonvolatile memory 13 in the form of CMOSRAM backed up by a battery, an input/output interfaces 15 and 17, an MDI (manual data input device) with a display device such as CRT and LCD, servo amplifiers 19 and 20 for machining feed axes of X-axis and Y-axis, respectively and a servo amplifier 21 for a gap control axis of Z-axis.

The ROM 12 stores a system program for generally controlling the laser machining apparatus 30 and the nonvolatile memory 13 stores a machining program created through the MDI 16 or inputted through an input interface (not shown). The RAM 14 is used for temporary storage of data in various operation processing. A laser oscillator 40 is connected to the input/output interface 15 and an output control signal from the processor 11 is sent to the laser oscillator 40 through the input/output interface 15. The laser oscillator 40 outputs a laser beam 41 in accordance with the output control signal and the outputted laser beam 41 is reflected by a bending mirror 42 to be directed to a machining head 35 and converged by an optical component (not shown) in the machining head 35 to be irradiated toward a workpiece 39 through a machining nozzle 36 attached to the machining head 35.

A sensor 37 is provided at the machining head 35 for measuring a gap amount between an end of the machining nozzle 36 and the workpiece 39. An output signal for the sensor 37 is sent to the controller 10 and read by the CPU through the A/D convertor 18 and the input/output interface 17 in the controller 10 as the gap amount.

A machine body 34 of the laser machining apparatus is provided with an X-axis servomotor 31 for driving a table 38 in an X-axis direction (right-and-left direction in FIG. 6), a Y-axis servomotor 32 for driving the table 38 in a Y-axis direction (direction perpendicular to a plane of the sheet in FIG. 6), and a Z-axis servomotor 33 for driving the machining head 35 with the machining nozzle 36 in a Z-axis direction (direction perpendicular to an X-Y plane).

The X-axis servomotor 31, the Y-axis servomotor 32, the Z-axis servomotor 33 are connected with the X-axis servo amplifier 19, the Y-axis servo amplifier 20 and the Z-axis servo amplifier 21, respectively. Each of the servomotors 31–33 is provided with a position/velocity detector such as a pulse coder for feeding back position/velocity of the associated servomotor to the associated servo amplifier. Each of the servo amplifiers 19, 20 and 21 controls position and velocity of the associated one of the servomotors 31, 32 and 33 based on a command from the processor and the feedback signal from the associated position/velocity detector. The servo amplifiers 19, 20 and 21 further perform current feedback control of the servomotors 31, 32 and 33, respectively, based on feedback signals from current detectors (not shown).

The laser machining apparatus of the above arrangement performs laser machining by moving the machining head 37 relatively to the workpiece 39 in accordance with the motion command while controlling the gap amount between the machining nozzle 36 and the workpiece 39 to be the predetermined value.

Figure 7:
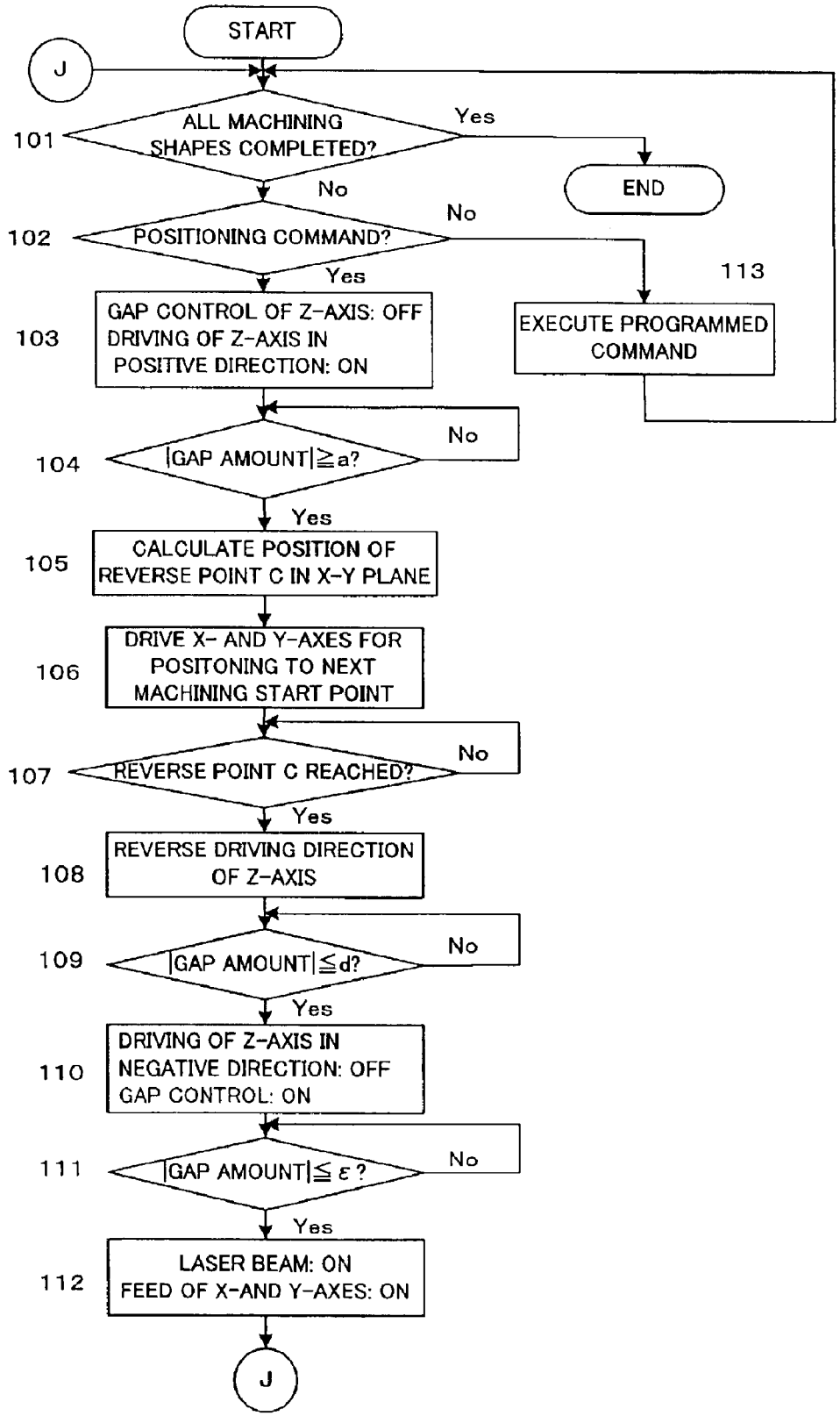

FIG. 7 shows processing to be executed by the processor 11 of the controller 10 for moving the machining head along the motion path as shown in FIG. 2a from the end point of one machining shape to the start point of the next machining shape.

A command in a machining program stored in the non-volatile memory 13 is read and it is determined whether or not the read command indicates a program end which means completion of machining of all machining shapes (Step 101). If the machining of all machining shapes is not completed, it is determined whether or not the read command is a positioning command (Step 102). If the read command is not the positioning command, the read command is executed (Step 113) and the procedure returns to Step 101.

If the read command is a positioning command which commands a motion of the machining nozzle from an end point of one machining shape to a start point of a next machining shape, the gap control of the Z-axis is turned off and a command for driving the Z-axis in a positive direction at a predetermined velocity is issued. Upon receipt of the command, the servo amplifier 21 drives the Z-axis servomotor 33 in the positive direction at the predetermined velocity such that the machining nozzle 36 of the machining head 35 moves away from the workpiece 39 (Step 103). A gap amount between the tip point of the nozzle 36 and the workpiece 39, which is detected by the sensor 37 and inputted through the A/D convertor 18 and the input/output interface 17, is read and it is determined whether or not the gap amount is equal to or greater than a predetermined value "a" (Step 104) and the procedure awaits until the gap amount becomes equal to or greater than the predetermined value "a".

In the above description, the determination whether or not the machining nozzle has moved by the predetermined value "a" in the Z-axis is performed based on comparison of the gap amount detected by the sensor 37 with the predetermined value "a". Alternatively, time elapsed from a start of driving of the Z-axis is measured by a timer and it may be determined that the machining nozzle has moved the predetermined amount "a" when a predetermined time has elapsed from the start of driving of the Z-axis. Further, the determination may be carried out based on a motion amount of the Z-axis obtained by the motion command or the position feedback amount from the end position A of one machining shape.

When the detected gap amount increases equal to or greater than the predetermine amount "a", X-axis and Y-axis coordinate values of a reverse point C at which the driving direction of the Z-axis is to be reversed in the driving of the X- and Y-axes to move the machining head from the end point A of one machining shape to the start point E of the next machining shape is calculated (Step 105). The X- and Y-axes coordinate values of the reverse point C are determined to be a middle position between the machining end point A and the machining start point E, or a position slightly displaced from the middle position closer to the machining start point E in the X-Y plane.

The positioning command to drive the X- and Y-axes to position the machining head at the machining start point E is outputted so that the X-axis servomotor 31 and the Y-axis servomotor 32 are driven through the X-axis servo amplifier 19 and the Y-axis servo amplifier 20, respectively (Step 106). It is determined whether or not the coordinate values of the X- and Y axes reach the coordinate values of the reverse point C based on the present values of a present position register storing the present positions of the X-axis and the Y-axis (Step 107). If the position of the machining head in the X-Y plane reaches the reverse point C, the driving direction of the Z-axis is reversed so that the Z-axis servomotor 33 is driven in the negative direction to move the machining nozzle 36 close to the workpiece 39 (Step 108).

The gap amount detected by the sensor 37 is read and it is determined whether or not the gap amount is equal to or less than the approach gap amount "d" and the procedure awaits until the gap amount decreases to be equal or less than the approach gap amount "d" (Step 109). When the gap amount decreases to be equal or less than the approach gap amount "d", the driving mode of the Z-axis is switched to the gap control mode (Step 110). In the gap control mode of the Z-axis, the gap amount is controlled such that the gap amount between the end of the machining nozzle 36 and the workpiece 39 is maintained to be the reference value. In driving the Z-axis in the gap control mode, when the detected gap amount becomes equal to or lower than an allowable value $\epsilon$ (Step 111), the processor outputs a signal to turn on a laser beam to the laser oscillator 40 through the input/output interface 15, and outputs a motion command for commencing machining feed of the X-axis and Y-axis (Step 112) and the procedure returns to Step 101. Thus, the machining of the next machining shape is started from the machining start point E.

Subsequently, the processing from Step 101 to Step 113 is repeatedly executed until all of the machining shapes designated in the machining program are completed.

In the foregoing embodiment, although the reverse point C is set to the middle position between the machining end point A and the machining start point E, as mentioned, the reverse point C may be set in the vicinity of by the middle point and it is desirable that the reverse point C is set to a position slightly closer to the machining start point E than the middle position.

In the foregoing embodiment, the driving of the X-axis and the Y-axis for moving the machining nozzle to the machining start point E is commenced when the Z-axis is driven by the predetermined value "a" in the direction away from the workpiece (the positive direction of the Z-axis). Alternatively, the machining head is moved in the Z-axis direction away from the workpiece at the predetermined velocity and also moved to the machining start point E in the X-axis direction and the Y-axis direction in accordance with laser machining. That is, since the laser machining is performed while maintaining the reference gap amount between the machining nozzle and the workpiece, the gap amount is formed at the machining end point A. Thus, there is no problem if the motion in the X-Y plane is commenced simultaneously with the motion in the Z-axis for the machining of a kind of workpiece.

FIG. 8 shows processing to be executed by the processor 11 of the controller 10 for moving the machining head along the motion path as shown in FIG. 2b from the end point of one machining shape to the start point of the next machining shape.

The processing of Steps 201, 202 and 215 is the same as the processing of Steps 101, 102 and 113 in the flowchart of FIG. 7. In Step 203, the gap control of the Z-axis is turned off and a command for driving the Z-axis in the positive direction at the predetermined velocity is outputted to the Z-axis servo amplifier 21. In this step, the present position of the X-axis is stored in a register as a motion start position xs directed to the machining start point of the next machining shape. In response to a motion command to drive the Z-axis in the positive direction at the predetermined velocity, the Z-axis servo amplifier 21 drives the Z-axis servomotor 33 to move the machining nozzle 36 away from the workpiece 39. The gap amount between the tip point of the nozzle 36 and the workpiece 39, which is detected by the sensor 37, is read, and it is determined whether or not the gap amount is equal to or greater than the predetermined value "a" (Step 204), and the procedure awaits until the gap amount increases to be equal to or greater than the predetermined amount "a".

When the detected gap amount becomes equal to or greater than the predetermined amount "a", a positioning command for driving the X-axis and the Y-axis so that the machining head moves to the machining start point E of the next machining shape to drive the X-axis servomotor 31 and the Y-axis servomotor 32 through the X-axis servo amplifier 19 and the Y-axis servo amplifier 20 (Step 205). Then, it is determined whether or not the coordinate value of the Z-axis reaches the set retreated position, i.e. the point C' (Step 206), and the procedure awaits until the coordinate value reaches the point C'.

When the coordinate position of the Z-axis reaches the retreated position C', the driving of the Z-axis is discontinued. The present position xr of the X-axis is read and a motion amount $\Delta x$ from the motion start point to the point C' is calculated by subtracting the motion start position xs stored in Step 203 from the read present coordinate value xr (Step 207). Then, the remaining motion amount of the X-axis to the machining start point of the next machining shape is calculated and it is determined whether or not the remaining motion amount is approximately equal to the motion amount $\Delta x$ obtained at Step 207 (whether or not the remaining motion amount is within a predetermined range of the motion amount $\Delta x$) (Step 209), and the processing of Steps 208 and 208 is repeatedly executed until the remaining motion amount of the X-axis is approximately equal to the motion amount $\Delta x$.

When the remaining motion amount of the X-axis is equal to the motion amount $\Delta x$, i.e. the machining head reaches the point C" as shown in FIG. 2b, the feed direction of the Z-axis is reversed to feed the Z-axis in the negative direction at the predetermined velocity (Step 210).

The subsequent processing is the same as that infra Step 109 in the flowchart of FIG. 7, i.e. the detected gap amount is read and it is determined whether or not the gap amount is equal to or less than the approach gap amount "d" (Step 211) and the procedure awaits until the gap amount decreases to be equal to or less than the approach gap amount "d". When the gap amount becomes equal to the approach gap amount "d", the driving of the Z-axis is changed to the gap control, i.e. the driving of the Z-axis at the predetermined velocity is turned off and the gap control is turned on (Step 213). When the detected gap amount becomes equal to or less than the allowable range $\epsilon$, the processor outputs a command for turning a laser beam on to the laser oscillator 40 and outputs a motion command for feeding the X-axis and the Y-axis (Step 214) and the procedure returns to Step 101. Thus, the machining of the next machining shape is executed. Subsequently, the processing from Step 201 to Step 215 is repeatedly executed and when a command indicating a program end is read, the procedure terminates.

In the second embodiment as shown in FIG. 8, it is determined whether or not the machining head has reached the point C" based on the motion amount of the X-axis from the start of motion from the machining start command and the remaining amount of the X-axis. Alternatively, it may be determined whether or not the machining head has reached the point C" based on the motion amount of the Y-axis as a machining feed axis or a composite motion amount of the X-axis and the Y-axis. In the case of determination based on the motion amount of the Y-axis, the present position of the Y-axis is read and stored as "ys" at Step 203, the present position yr of the Y-axis is read instead of the present position of the X-axis and the motion amount $\Delta y$ (=yr−ys) is obtained at Step 207, the remaining motion amount of the Y-axis is obtained at Step 208, and it is determined whether or not the remaining amount is equal to the obtained motion amount $\Delta y$ to confirm whether or not the representing position reaches the point C".

For determination based on the composite motion amount of the X-axis and the Y-axis, the present positions of the X-axis and the Y-axis are read in Step 203, the composite motion amount is obtained based on a difference between the present positions and the stored positions of the X-axis and the Y-axis in Step 207, and it is determined whether or not the composite motion amount is equal to the composite remaining motion amount at Step 209.

According to the present invention, time required for moving the machining head from an end point of machining of one machining shape to a start point of machining of next machining shape is shortened to improve machining efficiency.

What is claimed is:

1. A laser machining apparatus for machining a workpiece by irradiating a laser beam from a machining nozzle comprising:

a sensor for detecting a gap amount between the machining nozzle and the workpiece;

first driving means for driving a gap control axis to be controlled such that the gap amount detected by said sensor is maintained to a predetermined value in machining;

second driving means for driving machining feed axes to move the machining nozzle relative to the workpiece along a predetermined machining shape in machining; and a controller for controlling said first and second driving means, to start driving of the gap control axis so that the machining nozzle moves away from the workpiece at a machining end point of one machining shape, and to start driving of said machining feed axes so that the machining nozzle moves to a machining start point of a next machining shape in driving the gap control axis when the gap control axis is driven by a predetermined amount or for a predetermined time.

2. A laser machining apparatus according to claim 1, wherein said controller starts the driving of the machining feed axes when the gap amount detected by said sensor reaches a predetermined value.

3. A laser machining apparatus according to claim 1, wherein said controller determines a motion amount of the gap control axis from the start of driving of the gap control axis and starts the driving of the machining feed axes when the motion amount of the gap control axis reaches a predetermined value.

4. A laser machining apparatus according to claim 1, wherein said controller controls the driving of the gap control axis so that the machining nozzle moves close to the workpiece before coordinate position of the machining feed axes reach a coordinate position of the machining start point of the next machining shape.

5. A laser machining apparatus according to claim 4, wherein said controller reverses a direction of the driving of the gap control axis when the coordinate position of the machining feed axes reach a vicinity of a middle point between the machining end point of one machining shape and the machining start point of the next machining shape.

6. A laser machining apparatus according to claim 4, wherein said controller discontinues the driving of the gap control axis when the coordinate position of the gap control axis reaches a retreated position, and continues driving of the gap control axis in a reverse direction when a motion amount of the machining feed axes during the driving of the gap control axis becomes approximately equal to a remaining motion amount to the machining start point of the next machining shape.

7. A laser machining apparatus according to claim 1, wherein said controller starts control of the gap control axis such that the gap amount is maintained to the predetermined value when the gap amount becomes equal to or less than a predetermined allowable value after the coordinate position of the machining feed axes reaches the coordinate position of the machining start point.

8. A laser machining method for machining a workpiece with a laser beam from a machining nozzle by controlling a gap control axis such that a gap amount between the machining nozzle and the workpiece detected by a sensor is maintained to a predetermined value, and driving machining feed axes so that the machining nozzle moves relative to the workpiece along a predetermined machining shape, said method comprising:

starting driving of the gap control axis such that the machining nozzle moves away from the workpiece at a machining end point of one machining shape;

starting driving of the machining feed axes so that the machining nozzle moves to a machining start point of a next machining shape in driving the gap control axis when the gap control axis is driven by a predetermined amount or for a predetermined time; and reversing a direction of the driving of the gap control axis in a vicinity of a middle point between the machining end point of one machining shape and the machining start point of the next machining shape, to position the machining nozzle at the machining start point.

9. A laser machining method for machining a workpiece with a laser beam from a machining nozzle by controlling a gap control axis such that a gap amount between the machining nozzle and the workpiece detected by a sensor is maintained to a predetermined value, and driving machining feed axes to move the machining nozzle relative to the workpiece along a predetermined machining shape, said method comprising:

starting driving of the gap control axis such that the machining nozzle moves away from the workpiece at a machining end point of one machining shape;

starting driving of the machining feed axes so that the machining nozzle moves to a machining start point of a next machining shape in driving the gap control axis when the gap control axis is driven by a predetermined amount or for a predetermined time;

discontinuing the driving of the gap control axis when coordinate position of the gap control axis reaches a retreated position; and resuming the driving of the gap control axis in a reverse direction such that the machining nozzle moves close to the workpiece when a motion amount of the machining feed axes during the driving of the gap control axis becomes approximately equal to a remaining motion amount to the machining start point of the next machining shape, to position the machining nozzle at the machining start point.

10. A laser machining method for machining a workpiece with a laser beam from a machining nozzle by controlling a gap control axis such that a gap amount between the machining nozzle and the workpiece detected by a sensor is maintained to a predetermined value, and driving machining feed axes to move the machining nozzle relative to the workpiece along a predetermined machining shape, said method comprising:

starting driving of the gap control axis such that the machining nozzle moves away from the workpiece at a machining, end point of one machining shape, and starting driving of the machining feed axes so that the machining nozzle moves to a machining start point of a next machining shape simultaneously with the start of driving the gap control axis; and reversing a direction of the driving of the gap control axis in the vicinity of a middle position between the machining end point of one machining shape and the machining start point of the next machining shape, to position the machining nozzle at the machining start point.

* * * * *

UNITED STATES PATENT AND TRADEMARK OFFICE
CERTIFICATE OF CORRECTION

PATENT NO.    : 6,870,130 B2
DATED         : March 22, 2005
INVENTOR(S)   : Etsuo Yamazaki et al.

It is certified that error appears in the above-identified patent and that said Letters Patent is hereby corrected as shown below:

Column 4,
Line 27, change "E" to -- ε --.

Signed and Sealed this

Twenty-seventh Day of December, 2005

JON W. DUDAS
*Director of the United States Patent and Trademark Office*